Patented Jan. 2, 1940

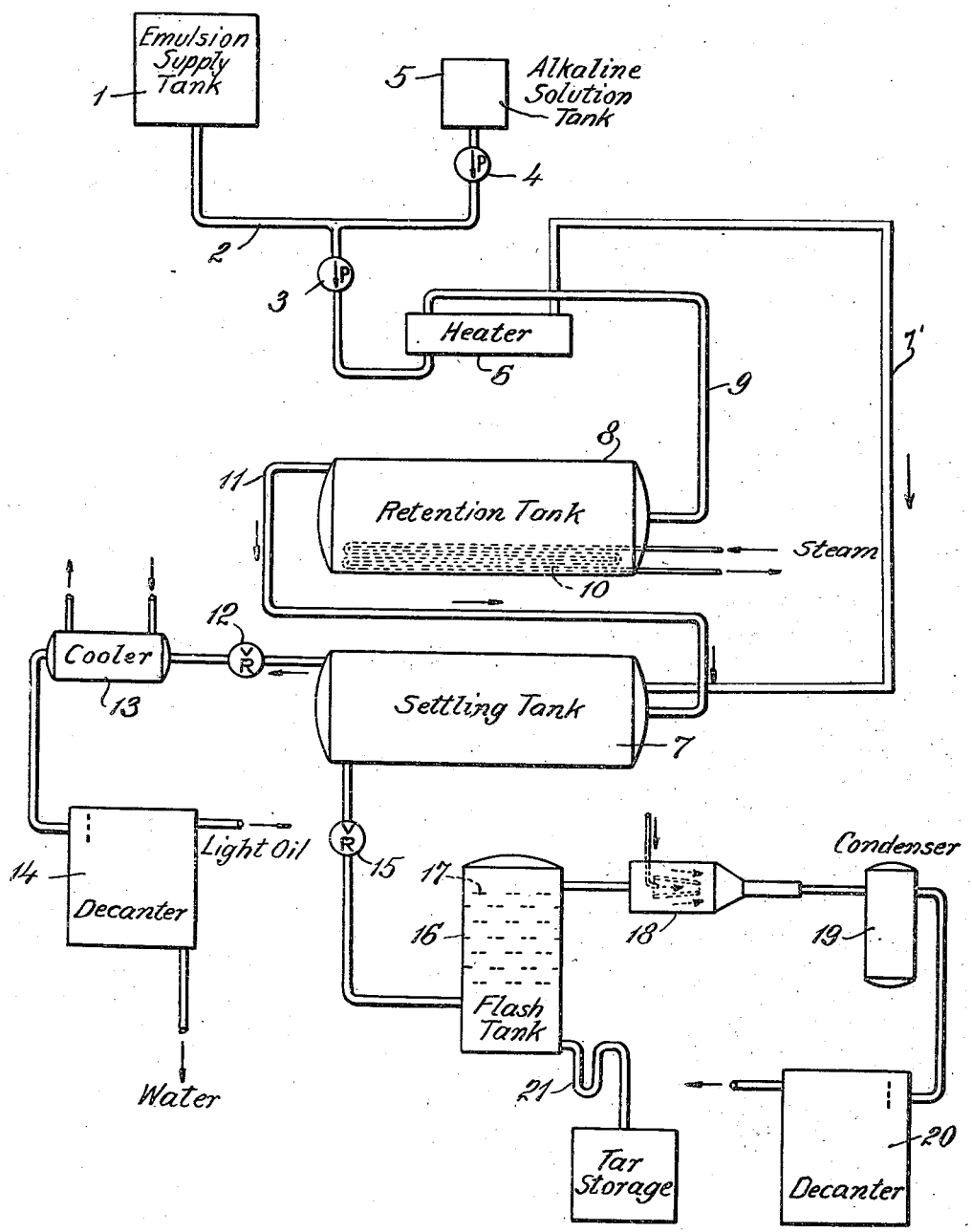

2,185,710

UNITED STATES PATENT OFFICE 2,185,710

PROCESS OF BREAKING EMULSIONS

Harry Brownley Pearson, Jr., New York, N. Y. assignor to Semet-Solvay Engineering Corporation, New York, N. Y., a corporation of New York Application January 31, 1938, Serial No. 187,783

2 Claims. (Cl. 196—4)

The present invention relates to de-emulsifying water gas tar emulsions which are produced as by-products in the manufacture of carburetted water gas.

In the manufacture of carburetted water gas, blue gas formed in the generator passes into the carburetor, where petroleum oils are cracked to enrich the blue gas, the resultant mixture of blue gas and oil gas being passed through the superheater, where the gas is fixed. From the superheater the gas passes through a water seal and then through cooling or scrubbing towers to and through other gas purifying equipment to the holder. At times steam is passed in a reverse direction through the superheater and carburetor into and through the fuel bed of the generator, petroleum oil being introduced into the generator and there cracked, the mixture of oil and blue gas passing through the generator and thence through a water seal to the usual cooling and scrubbing towers. As the make gas passes through the water seal, cooling and scrubbing towers, tar is removed therefrom; in the water seal and also in the cooling and scrubbing towers if the gas is washed with water, some or all of the tar may form an emulsion with the water.

Various types of oils are used to carburet the gas, depending upon the particular oil available where the gas is made and the cost thereof. Gas oil, a refined petroleum oil, is frequently used. It, however, is relatively expensive and in many plants cheaper oils, such as heavy oils, for example Bunker oil or residuum oils, are employed. The character of the oil used to carburet the gas affects the character of the tar removed from the gas and also the tar emulsion produced when the tar mixes with water in the water seal, coolers and scrubbers. Thus, for example, when heavy oil and residuums are used to carburet the gas, tar emulsions are produced which are difficult to break. The tar emulsions produced utilizing gas oil as the carburetting medium generally are more easily broken.

It has been proposed to break water gas tar emulsions by a batch procedure involving the introduction of the emulsion and a small amount of de-emulsifying agent such as caustic soda in a tank; heating this mixture to boiling under atmospheric pressure; continuing the heating without permitting vaporization under increased pressure and discontinuing the heating and gradually relieving the pressure to produce quiescence and thus permitting separation of the tar into a distinct stratum. Such batch operation generally requires two or more days for the treatment of a given batch of emulsion to effect the breaking thereof. Moreover, the capacity of a batch process is obviously limited to that of the tank in which it is carried out, and hence in order to effect the breaking of large volumes of emulsion such as are available at many gas plants, a large number of tanks for the treatment of the emulsion, occupying considerable floor area, must be used.

It is an object of this invention to provide a continuous process for breaking water gas tar emulsions, which process can be used to efficiently break all types of water gas tar emulsions now produced, i. e., water gas tar emulsions resulting from the operation of plants utilizing heavy oil or residuum as the carbureting medium as well as those utilizing gas oil. Other objects and advantages of the present invention will be apparent from the following description.

In accordance with this invention, an alkaline solution is added continuously to a stream of water gas tar emulsion, the amount of alkaline solution added being controlled so as to produce in the resultant mixture an alkalinity corresponding to a pH of about 8 to about 10.5. The amount of de-emulsifying agent may be such as to produce a pH of above 10.5, but as this would involve use of an unnecessary excess of alkaline material, for economic reasons it is preferred to add alkaline material in amounts so as to produce a mixture having a pH not in excess of 10.5 and preferably about 8. The de-emulsifying agent added may be caustic soda, resin soap, soda ash or other suitable alkaline de-emulsifying material.

In one example of the practice of my invention, in the breaking of a water gas tar emulsion derived from gas carbureted with heavy oil, one gallon of caustic soda solution containing 10% by weight of caustic soda was added to each 1000 gallons of emulsion, resulting in a mixture having a pH of about 8.2.

The mixture of de-emulsifying agent and emulsion is then pumped continuously through a heater such as a heating coil, in which the mixture is heated to a temperature of about 75° to about 350° F. and maintained under a pressure of about 50 to about 120 pounds gauge. The temperature to which the mixture is heated depends largely upon the character of the tar emulsion, and for best results, I have found, should be such that substantially no vaporization of any of the constituents of the mixture of emulsion and de-emulsifying agent takes place at the pressure at which this mixture is maintained during the heating and subsequent settling step. If the water gas tar emulsion results from gas carbureted with heavy oil, a relatively high temperature should be used, of the order of about 300° to about 350° F.; if the gas is carbureted with oil residuums, the temperature to which the mixture of emulsion and de-emulsifying agent may be heated may be of the order of about 250° to about 300° F.; and if the gas is carbureted with gas oil, the emulsion and de-emulsifying agent may be heated to a temperature of about 75° to about 125° F. Correspondingly, the pressure to which the mixture is subjected varies with the character of the tar emulsion; if the tar produced is derived from gas carbureted with heavy oil, a pressure of about 100 to about 125 pounds gauge may be utilized; if the tar is derived from gas carbureted with oil residuums, a pressure of the order of about 75 to about 100 pounds gauge may be used; and if the tar is derived from gas carbureted with gas oil, a pressure of the order of about 50 to about 75 pounds gauge may be used. From the heater the tar emulsion and de-emulsifying agent are passed while under pressure to a settling tank, from which tar and water-containing light oils are separately withdrawn, and the pressure then released thereon.

The time of treatment of the emulsion may vary between one and six hours, depending upon the character of the tar emulsion to be broken. Thus, tar emulsion derived from gas carbureted with heavy oil may be treated for about five to six hours, tar emulsion derived from gas carbureted with oil residuums for about three to four hours, and tar emulsion derived from gas carbureted with gas oil for about one to two hours. The time referred to is the time of treatment of each particle of emulsion beginning with the moment of introduction of emulsion into the heater admixed with de-emulsifying agent and ending with the moment when the tar and water are withdrawn from the settling tank and the pressure released thereon.

The invention will be further described in connection with the accompanying drawing which is a flow sheet of the process and shows diagrammatically apparatus suitable for the performance of the process.

A water gas tar emulsion from emulsion supply tank 1 is conveyed by line 2 to pump 3, which continuously introduces the emulsion into the system under pressure. Pump 4 withdraws an alkaline solution from tank 5 and introduces this solution into line 2. The pumps 3 and 4 are interconnected so that the ratio of alkaline solution de-emulsifying agent to emulsion may be adjusted as desired. The emulsion, mixed with the de-emulsifying agent, introduced into the pressure system by the pump 3, is conveyed to heater 6, from which it may be conveyed directly to settling tank 7 through line 7l, or, if desired, may be first introduced by line 9 into one end of the horizontally-extending retention tank 8 which has a steam coil 10 located in the lower portion thereof. As the emulsion mixture flows longitudinally through the retention tank, the steam coil produces convection currents in the emulsion which effect a thorough mixing of the constituents thereof. The emulsion mixture is continuously withdrawn from the opposite end of the retention tank 8 by line 11 and introduced into one end of the horizontally-extending settling tank 7.

As the emulsion mixture flows longitudinally through tank 7 it stratifies into two layers, water containing some light oil rising to the top of the tank and the tar settling to the bottom. The water containing light oil is withdrawn from the tank at the upper portion of the outlet end through reducing valve 12. After reducing the pressure, the water-light oil mixture is introduced into cooler 13. Alternatively, the water which is withdrawn from the tank may be cooled prior to reducing the pressure. However, reduction of the pressure prior to cooling is preferred as the cooler may then be operated under atmospheric pressure. The cooled water-light oil mixture is introduced into decanter 14 where the light oil separates from the water.

The tar layer is withdrawn from the settling tank 7 at the lower portion of the outlet end through reducing valve 15, and is introduced into flash tank 16 below a series of foam-collapsing plates or baffles 17. Light oil and water carried by the tar vaporizes in the flash tank and is withdrawn by steam ejector 18. The mixture of steam and light oil from the ejector is introduced into condenser 19 from which the oil and water mixture is conveyed to decanter 20 where the light oil may be separated from the water. The tar is withdrawn from the lower end of the flash tank 16 through a U-tube 21 and is conveyed to storage.

The tar and water layers may be withdrawn concurrently or alternately. Preferably alternate withdrawal of the water and tar layers from tank 7 is employed because by so doing I have found that pressure conditions within the heater, retention tank, if used, and the settling tank are less likely to be disturbed.

It will be noted the present invention provides a continuous process for breaking water gas tar emulsions which is simple to carry out and is of high through-put capacity. In practice it has been found that by the process of this invention water gas tar emulsion derived from gas enriched with heavy oils and which are known to be difficult to break can be efficiently broken.

It is to be understood that this invention is not restricted to the present disclosure, as variations may be made without departing from the scope of the invention.

I claim:

1. The process of breaking water gas tar emulsions which comprises continuously adding an alkaline de-emulsifying agent to a stream of water gas tar emulsion in amount such as to produce a mixture having an alkalinity corresponding to a pH of at least about 8, continuously heating said mixture to a temperature of from about 75° to about 350° F. while maintaining the mixture under a pressure of about 50 to about 120 pounds gauge, continuously flowing the mixture from said heating zone to a settling zone while maintaining the mixture under said pressure of from about 50 to about 120 pounds gauge, permitting the mixture to separate into water and tar layers in said settling zone, separately withdrawing the water and tar from the settling zone and then releasing the pressure thereon.

2. The process of breaking water gas tar emulsions which comprises continuously adding a caustic soda solution to a stream of water gas tar emulsion in amount such as to produce a mixture having a pH of from about 8 to about 10.5, continuously flowing said mixture through heating and settling zones at a rate such that it requires from about 1 to about 6 hours for a particle of tar emulsion in said continually flowing stream to pass through the said heating and settling zones, continuously heating said mixture in the heating zone to a temperature of about 75° to about 350° F. while maintaining said heating zone under a pressure of about 50 to about 120 pounds gauge, maintaining said settling zone under a pressure of from about 50 to about 120 pounds gauge, permitting the mixture to separate into water and tar layers in said settling zone, separately withdrawing the water and tar from the settling zone and then releasing the pressure thereon.

HARRY B. PEARSON, Jr.